(No Model.)

J. A. RITZ.
BELT HOOK.

No. 364,673. Patented June 14, 1887.

WITNESSES
Edwin L. Yewell,
Chas. Helm.

INVENTOR
John A. Ritz

Geo. T. Murray Attorney

United States Patent Office.

JOHN A. RITZ, OF FRANKLIN, OHIO.

BELT-HOOK.

SPECIFICATION forming part of Letters Patent No. 364,673, dated June 14, 1887.

Application filed December 14, 1885. Serial No. 185,660. (No model.)

*To all whom it may concern:*

Be it known that I, JOHN A. RITZ, a citizen of the United States, residing at Franklin, in the county of Warren and State of Ohio, have invented a new and useful Belt-Hook for the Union of Machine-Belts, of which the following is a specification.

The mechanism of my invention is illustrated by the accompanying drawings, in which—

Figure 1:
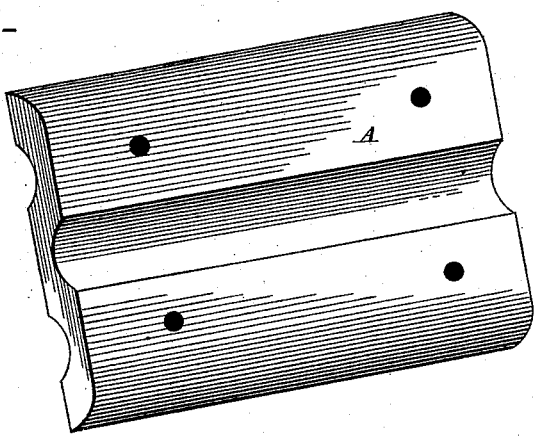
Figure 2:
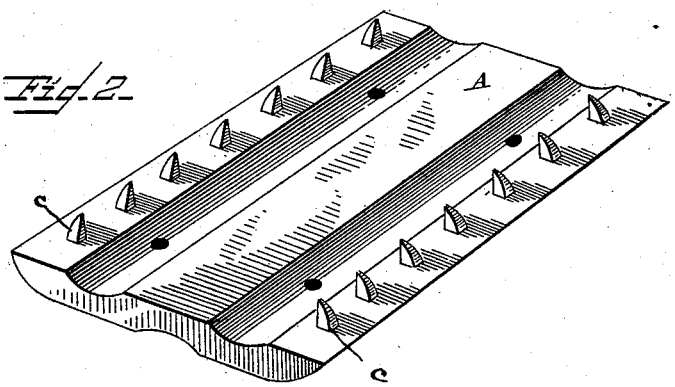
Figure 3:
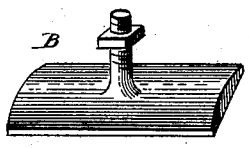
Figure 4:
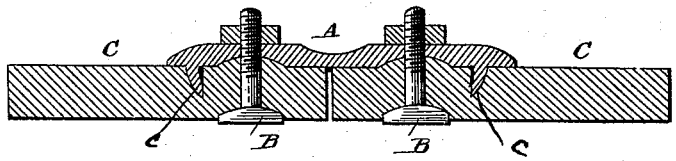

Figure 1 is a top view of a metal plate having two convex or rounded opposite edges and a slightly-concave surface extending through the center. Fig. 2 is the reverse side or bottom view of the plate having near and along each long side a row of small hooks at regular distances apart and all inclining slightly toward center of plate. On the inner side, extending with and near each of these rows of hooks, is a slightly-concave surface. Fig. 3 is a screw-clamp with one rounded or convex side, having a bolt and nut attached in the center. Fig. 4 is a vertical section made lengthwise of belt and crosswise of plate, showing my invention when applied.

Referring to the drawings, A represents the clamping-plate, the opposite ends of which are concave upon the under or belt side, and the top portions opposite these concaves are rounded or convex. The center portion of the plate is concave upon the upper side, as shown at Fig. 4. The under side of the plate, at its opposite concave edges, is provided with rows of short teeth c, slightly hooked or inclining toward the center. These teeth are beveled or rounded upon the outside, and should be of a length to pass about half-way through the belt C.

The clamping-bolts Fig. 3 have their heads next to the shank rounded, to conform to the concave under side of the plate, so that when the shanks of the bolts are passed through the belt and the plate A and the nuts tightened down upon the top of the plate the belt will be firmly pressed into the concave under surfaces of the plate, as seen in Fig. 4, and, with the aid of the teeth c, insuring the firm retention of the parts in the position shown.

The plate is made of malleable metal, and the central concave upon the upper side of the plate provides for its easy bending to conform to the size of the pulley, whether large or small.

What I claim is—

1. In a belt-fastener, the combination, substantially as hereinbefore set forth, of a plate adapted to conform to the outside of the belt, and having near its two opposite edges rows of short hooked teeth, the hooks inclining toward the center, and bolts, such as shown, for clamping the plate to the belt.

2. The combination, substantially as specified, of the curved clamping-plate having short hooked teeth and perforated to receive fastening-bolts with the flat-headed bolts to pass through the belt and plate from the inside, and nuts to clamp the plate and belt together.

3. As a new article of manufacture, the hereinbefore-described malleable-metal belt-fastening plate having its end portions upon the under side concave, and provided near the edges with slightly-hooked teeth c, inclining toward the center, and the top center portion concave in the opposite direction from the end concaves, said plate being perforated to receive clamping-bolts, substantially as shown and described.

JOHN A. RITZ.

Witnesses:
J. D. MILLER,
H. J. DEATH.